United States Patent [19]

Emmons et al.

[11] Patent Number: 4,985,911

[45] Date of Patent: * Jan. 15, 1991

[54] CONVERSATIONAL VIDEO PHONE

[75] Inventors: Lawrence D. Emmons; James S. Mackley, both of Grass Valley; David H. Stokes, Nevada City; Rudolph S. Stefenel; William E. Brisko, Jr., both of San Jose; Michael A. Cooper-Hart, Cupertino, all of Calif.

[73] Assignee: Mitsubishi Electronics America, Inc., Cypress, Calif.

[*] Notice: The portion of the term of this patent subsequent to Dec. 22, 2004 has been disclaimed.

[21] Appl. No.: 331,006

[22] Filed: Mar. 27, 1989

Related U.S. Application Data

[60] Division of Ser. No. 92,346, Sep. 2, 1987, Pat. No. 4,932,047, which is a continuation-in-part of Ser. No. 795,967, Nov. 7, 1985, Pat. No. 4,715,059.

[51] Int. Cl.$^5$ .................... H04M 11/00; H04N 7/14
[52] U.S. Cl. ........................................ 379/53; 379/98; 358/85
[58] Field of Search .............. 379/53, 93, 98; 358/85, 358/183

[56] References Cited

U.S. PATENT DOCUMENTS 4,485,400 11/1984 Lemelson et al. .................. 358/85
4,715,059 12/1987 Cooper-Hart et al. .............. 379/53

Primary Examiner—Jin F. Ng
Assistant Examiner—Stella L. Woo
Attorney, Agent, or Firm—Townsend & Townsend

[57] ABSTRACT

An improved video phone which transmits a source image over a standard telephone line in conjunction with audio voice signals is disclosed. The unique initialization protocol allows asynchronous transmission with its short format. The protocol format provides for a hardware preamble for synchronizing a receiver clock, a software preamble for identifying the video image and disabling the audio, automatic gain control adjustment data and amplitude calibration data. The audio portion is disabled by coupling a capacitor across the telephone to effectively short the telephone. The telephone is placed across the bridge circuit which is provided with switches to balance the bridge in both the telephone audio and the video modes. The transmitted as well as the received signal are passed through the same delay equalization circuit, so that half the delay equalization is done before transmission, with the remaining half being done after reception. The use of a multiplexer and demultiplexer allows the same circuit to be used. The digital signals are level shifted from 5 volts to 10 volts prior to being converted into analog, and then are level shifted down again to reduce the effects of DC offset. The digital and analog voltage supplies are coupled together with a resistor and diode, and a capacitor is coupled between the analog supply and ground to combine the reset and voltage supply functions. An RC circuit providing 180° of phase shift is coupled to the crystal oscillator to produce a clock which is locked into the series resonant frequency of the oscillator. The camera and the rest of the circuitry is turned on and off by a switch coupled to panel which can be slid in front of the camera, thus providing for the automatic protection of the camera lens when the system is switched off.

6 Claims, 6 Drawing Sheets

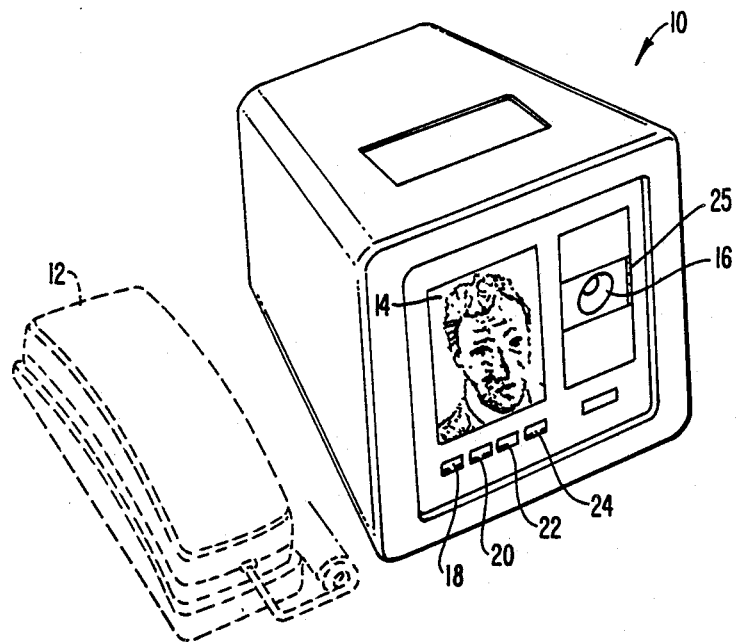
FIG._1.
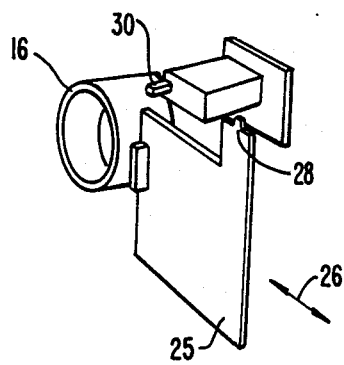
FIG._1A.

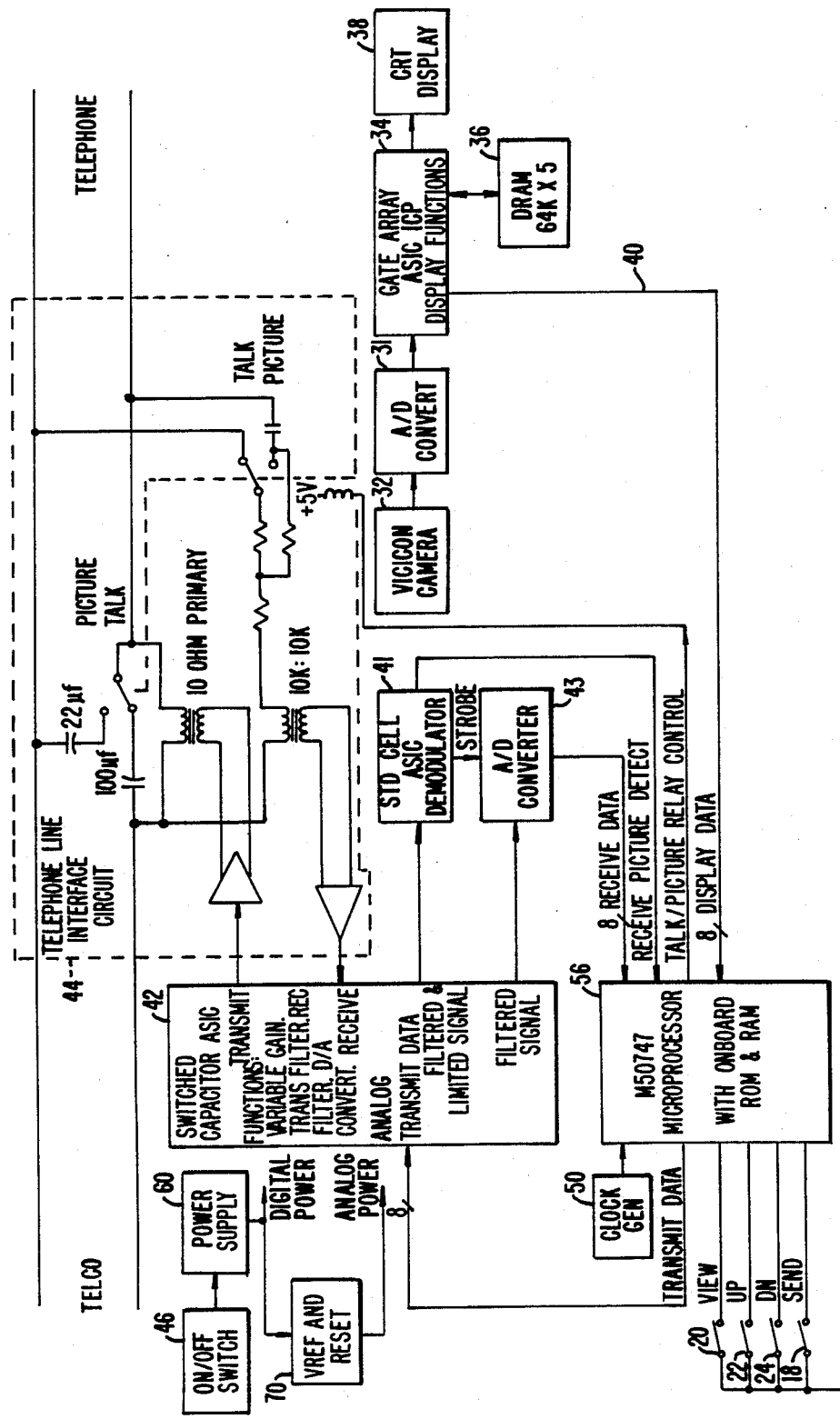
FIG._2.

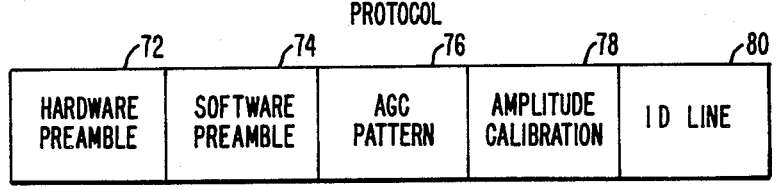
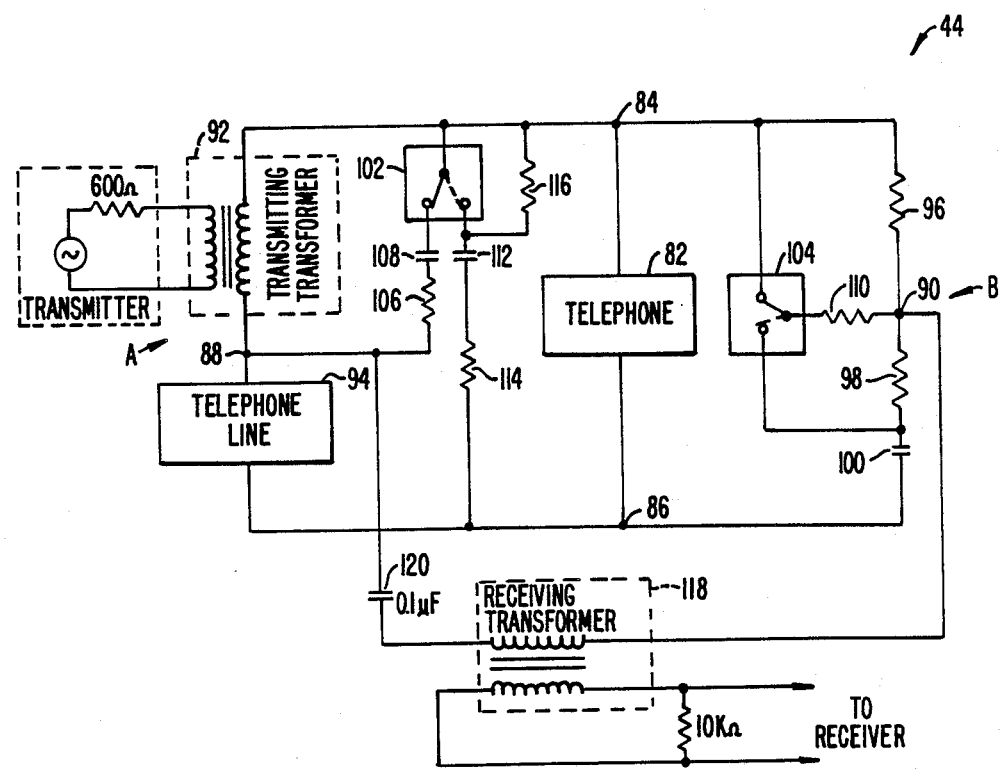

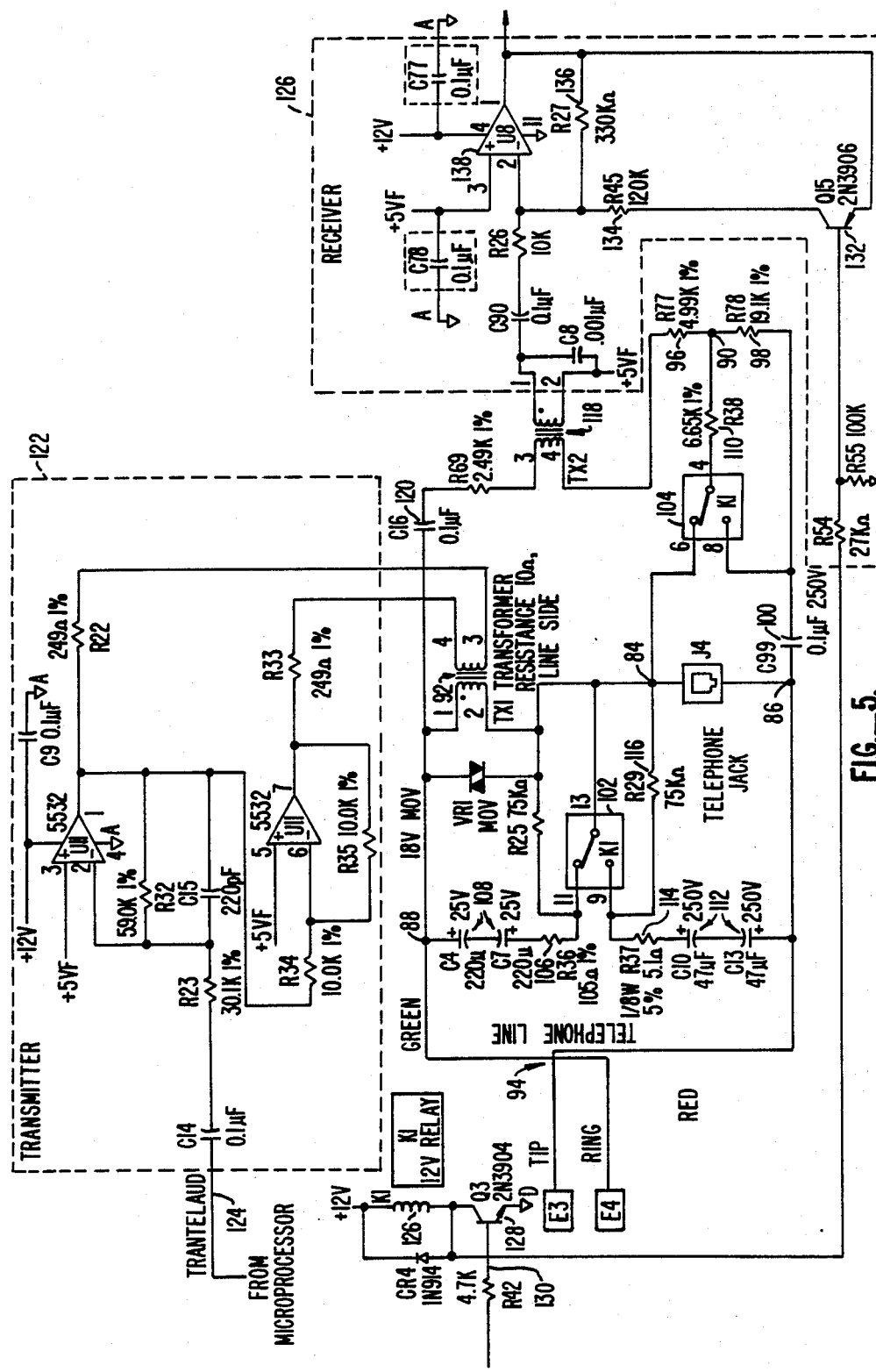
FIG._5.

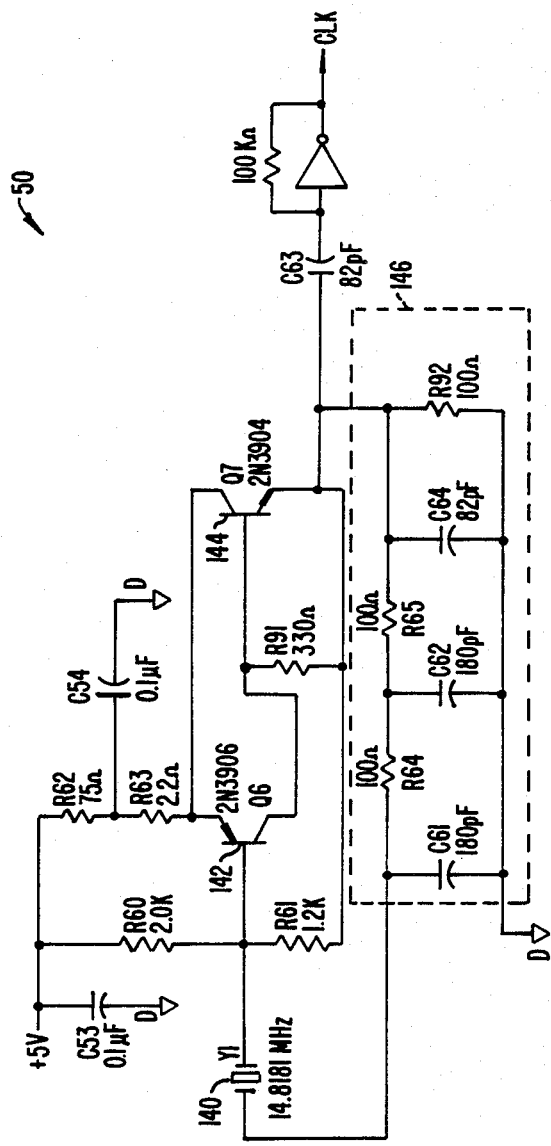
FIG._6.
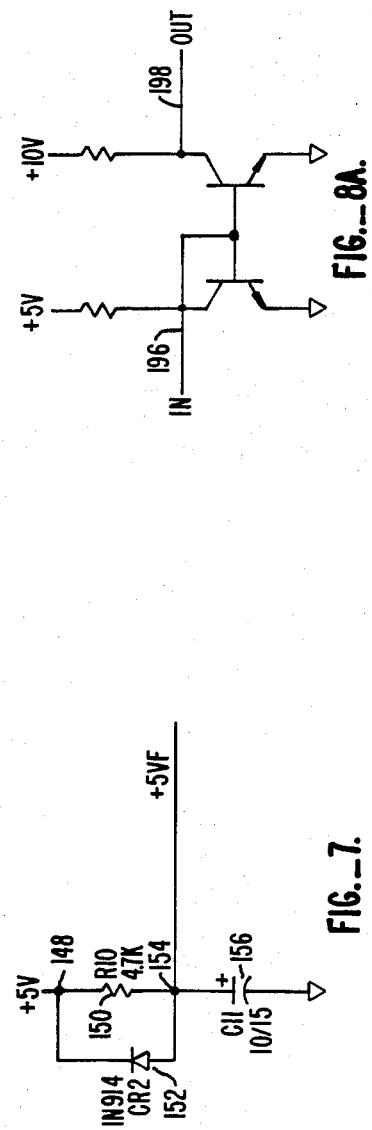
FIG._8A.
FIG._7.

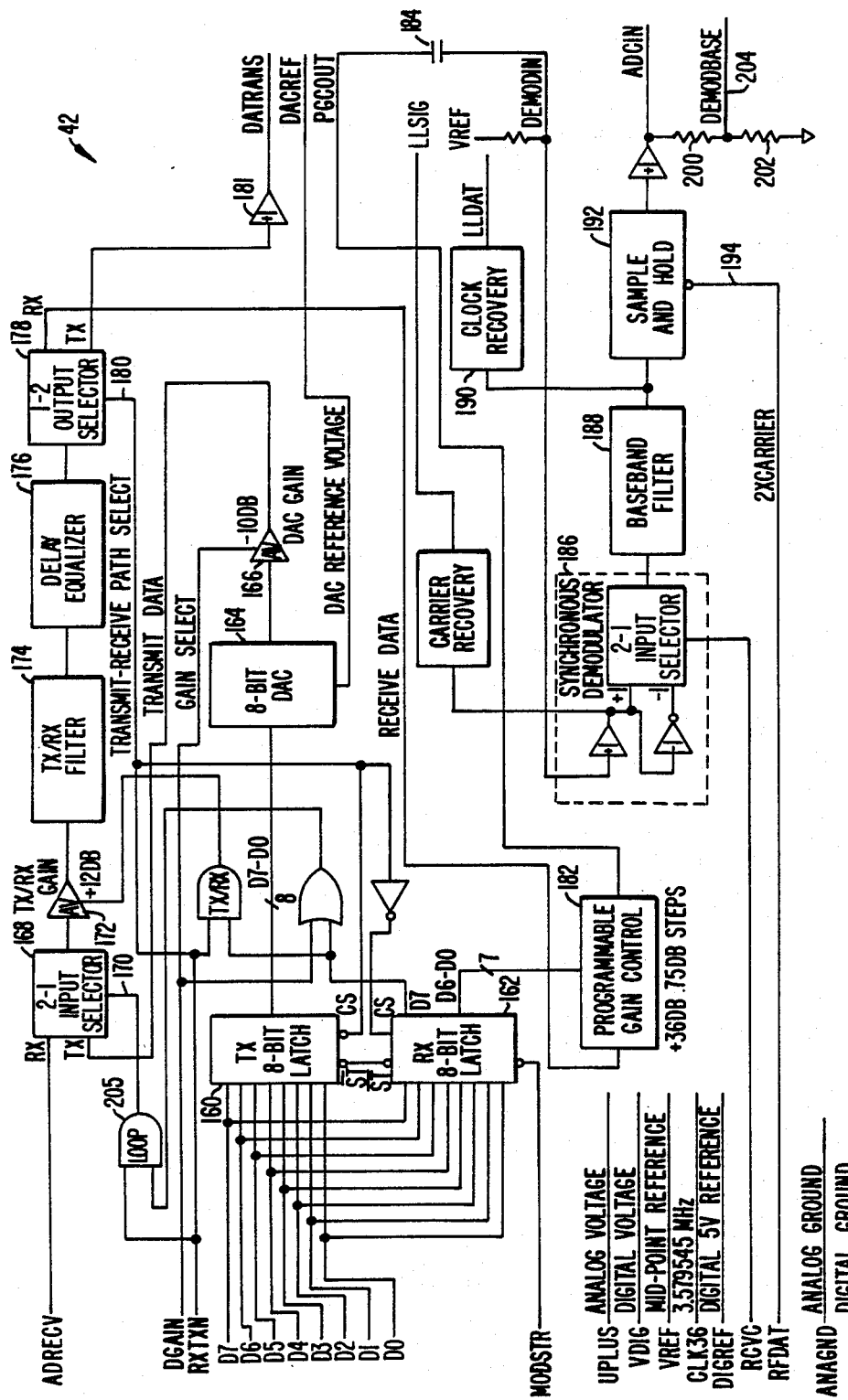
FIG._8.

CONVERSATIONAL VIDEO PHONE

This is a division of application Ser. No. 092,346, now U.S. Pat. No. 4,932,047, filed Sept. 2, 1987, which is a continuation-in-part of application Ser. No. 795,967, now U.S. Pat. No. 4,715,059, filed Nov. 7, 1985.

BACKGROUND

This invention relates to a video phone for transmission of audio signals and freeze-frame video images over voice grade telephone lines.

Video teleconferencing systems typically require dedicated communication channels with a high bandwidth in order to transmit the large amount of data required to represent a complex video picture as in the case of text or graphics. Such devices require a communication channel having a bandwidth in the megahertz (MHz) range. See, for example, U.S. Pat. No. 3,982,063.

Video transmission systems intended to operate over voice grade telephone lines must contend with the fact that the usable telephone bandwidth is only approximately three kilohertz. Because of this bandwidth limitation and a corresponding limitation in the amount of data that can be sent, some of these systems only send a single video frame, rather than a moving picture. In addition, a long time is required for transmission, usually in the range of thirty to sixty seconds or more. See, for example, U.S. Pat. No. 3,842,199, which discloses a video (only) transmission system and U.S. Pat. No. 4,099,202 which discloses a method for multiplexing a slow scan TV signal with a voice signal.

When single frames of the video image are sent, the message header can become a significant portion of the transmitted information. Accordingly, the protocol used for the header is important. For an asynchronous system, a new header must be sent with each data package. Accordingly, the long headers used for synchronous systems noticeably lengthen the transmission time for asynchronous, single frame systems.

Freeze-frame video systems have other problems not associated with other telephone equipment. For instance, when a modem picks up a telephone line, there is typically a loud click noise due to the instantaneous application of a voltage across the line. This is not a problem for modems, since the phone is typically not at the user's ear when the modem is connected. However, for video phones, the telephone typically is at the user's ear when a picture is sent.

Freeze-frame video telephones have other problems due to the necessity for transmitting the pixel data in as short a time as possible, thus limiting the amount of error checking, etc. that can be used without lengthening the transmission time. For instance, DC voltage offsets can be picked up in the analog portion of the modem which are then transferred over to the digital portion when the pixels are decoded, introducing errors.

In another aspect of video phones common to modems, equalization is used at the receiver end to compensate for group delay of transmissions over the telephone line. This typically takes the form of four or five sections of all-pass filters with phase delay which is the inverse of the phase delay over the telephone line.

SUMMARY OF THE INVENTION

The present invention is a conversational freeze-frame video phone which transmits a source image over a standard telephone line in conjunction with audio voice signals. A camera is used to capture an image to be transmitted and the image is mapped onto an image field. This image field is displayed on a video screen. Digitized data representing the pixels is asynchronously transmitted on a modulated signal in a single burst. Corresponding remote images are asynchronously received, demodulated, and displayed.

The asynchronous burst of video information used by the present invention eliminates the need for continual synchronizing as required for a multiplexed system. A time-multiplexed system which transmits portions of a picture multiplexed with voice signals requires continual synchronization or a new header with each transmission and thus a longer overall transmission time. The invention utilizes an initialization protocol which signals that a video image transmission is coming. Upon detection of this portion of the protocol, audio transmission is inhibited. The remaining portion of the protocol provides for automatic gain control (AGC) and amplitude calibration prior to reception of the video image data itself.

The system of the present invention may incorporate its own telephone or have a connector for connection to the user's existing telephone. A telephone line interface circuit is provided for coupling either the telephone or the video picture modem to the telephone line without introducing a clicking noise by the instantaneous application of the voltage across the telephone line. This is accomplished by adding some circuitry to a hybrid bridge circuit. A pair of switches are provided for disabling the phone by coupling a capacitance across the phone and for switching an RC circuit across one bridge leg and a resistor across the second bridge leg to balance the bridge with the telephone removed. A resistor is coupled to the capacitor used to disable the phone so that the capacitor is charged to almost its full value prior to the time the phone is disabled. This resistor is then shorted out by one of these switches, but no large voltage is applied because the capacitor is already substantially charged.

The present invention includes a hybrid bridge that joins a common telephone, a video unit, and a telephone line. This hybrid bridge is unique because it accomplishes several things in a simple circuit. The sound picked up by the telephone microphone is virtually kept from interfering with transmitting and receiving pictures. In the picture mode, the signals generated by sound are attenuated by connecting a large capacitor across the telephone during this time. These signals are also attenuated for the picture receiver circuit because the circuit doubles as a hybrid bridge.

When in telephone mode, the video unit must detect a preamble that starts the process of receiving a picture. It is important to reduce signals from the telephone microphone that go into the picture receiver circuit. Since the telephone must be active, a way to get attenuation is for the circuit to double as a hybrid bridge in telephone mode too.

In both cases, the hybrid bridge is designed to give cancellation to the telephone microphone signal going into the picture receiver circuit.

The present invention uses a unique delay equalization circuit, with the same circuit being used on both the transmitting and receiving ends. Thus, the transmitted signal is provided with a phase delay to offset a portion of the anticipated telephone line phase delay, with the remaining compensation phase delay being provided on the receiving end. A pair of multiplexers are provided to route the signal through the same delay equalization circuit on both the transmitting and receiving ends.

A feedback circuit is provided for diagnostic purposes to allow a transmitted signal to be routed back through to the receiver without being sent over the telephone line. This is accomplished by appropriate control signals to the multiplexers coupled to the delay equalization circuit.

The present invention also provides combined analog voltage supply and reset circuit. In a typical prior art video phone, which incorporates both analog and digital circuitry, the digital power supply is turned on and a separate RC delay circuit provides a reset delay before the voltage is applied to the analog circuitry. The present invention couples the digital voltage source to the analog voltage source through a resistor and a diode. The analog voltage source is then coupled to ground through a capacitor. The capacitor quickly discharges when power is turned off, and then turns on slowly to provide a reset delay when power is applied.

The camera of the present invention is provided with a panel which is slid across the front of the camera lens to block the camera when not in use. This protects the camera from light burns and the camera tube from ambient light, while also protecting the camera lens from dust contamination and providing privacy to the user. This panel is coupled to the on/off switch for the circuitry of the present invention, thus forcing the user to protect the camera when the device is turned off.

An improved crystal oscillator is used in the present invention. The circuit is designed to be a phase-shift RC oscillator even by itself, without the crystal. The circuit is designed to oscillate at the crystal frequency even if a capacitor were substituted for the crystal. The capacitor would be large enough to be considered virtually a zero impedance so that it would not influence the oscillator frequency.

Since the crystal exhibits it's lowest impedance, and zero phase shift, at it's series resonance frequency, the oscillator will function the same when the capacitor is replaced by the crystal. The difference is that the oscillator is now crystal controlled, with the crystal oscillating at it's series resonance frequency.

This crystal oscillator has advantages over many other crystal oscillators:

1. It won't go into an undesirable overtone mode because there is not enough loop gain at those higher frequencies for oscillation.

2. The crystal frequency is not sensitive to component values. Some crystal oscillator circuits include an LC tank circuit to guarantee that the oscillator won't oscillate at an overtone frequency. The problem with this is that the inductor and capacitor have a strong influence over the crystal frequency. This sensitivity forces the designer to use an expensive inductor and capacitor with tighter percent tolerances.

The present invention also provides analog circuitry for performing the modem functions and the transmitting and receiving. Digital-to-analog and analog-to-digital converters are provided for the input and output of this analog circuit. In order to reduce the effects of DC voltage offset, the analog signals are processed at higher voltages. The digital signals are level shifted up (i.e., from 5 volts to 10 volts) at their input to provide higher level signals for switching the higher level analog signals. The signals are then processed, and when the analog signal is converted into digital form, the digital signal is level shifted down to the lower voltage level. Thus, any DC voltage offset picked up in the circuit will be reduced in half by the level shifting, thus improving the systems signal-to-noise ratio.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a perspective view of a video system for coupling to a telephone according to the present invention;

FIG. 1A is a perspective view, partially broken away, of a portion of the video system of FIG. 1 showing the camera protection panel;

FIG. 2 is a block diagram of the electronic circuitry of the present invention;

FIG. 3 is a diagram of the protocol for the header according, to the present invention;

FIG. 4 is a diagram of the telephone line interface circuit of the present invention;

FIG. 5 is a detailed circuit diagram of the circuit of FIG. 4;

FIG. 6 is a circuit diagram of an oscillator according to the present invention;

FIG. 7 is a circuit diagram of the combination digital and analog voltage supply and reset circuit according to the present invention;

FIG. 8 is a block diagram of the analog circuit of the present invention showing the delay equalization and diagnostic feedback circuits; and FIG. 8A is a circuit diagram of a level shifting circuit used in the circuit of FIG. 8.

DETAILED DESCRIPTION OF THE PREFERRED EMBODIMENT

FIG. 1 is a perspective view of a video system 10 according to the present invention which can be coupled to a user telephone 12 shown in phantom. The video system includes a display screen 14 and a camera 16. A number of pushbuttons are provided. A pushbutton 18 allows the user to send a video image. A pushbutton 20 switches the display between the received image and the mirror image of the user as observed by camera 16. Pushbuttons 22 and 24 adjust the brightness up and down, respectively, of the image on screen 14. A privacy panel 25 can be slid in front of camera 16 to protect it when the unit is not in operation.

FIG. 1A shows privacy panel 25 in more detail. The panel slides in directions 26. When the panel passes in front of camera lens 16, an upperly protruding member 28 will trip a microswitch 30 which will turn off power to the circuitry of the present invention. Thus, by the simple act of turning off the video unit, a user is forced to protect the camera lens. This protects the camera from ambient light burns when the unit is turned off.

FIG. 2 is a block diagram of the circuitry of the present invention. A TV camera 32 is used to capture a video image of the telephone user. The image from camera 32 is fed through an analog-to-digital (A/D) converter 31 to an image control processing (ICP) circuit 34. ICP circuit 34 can be a standard video display processor with additional circuitry for digitizing the video image. The video display processor portion contains the video sync generator. Processing circuit 34 can also retrieve the data from RAM 36 and convert the data into analog form by means of a digital-to-analog (D/A) converter in circuit 34. The analog values are then fed to a cathode ray tube (CRT) display 38 to display the image. Processing circuit 34 also transfers data from RAM 36 to a microprocessor bus 40. A modem is provided from analog circuit 42, demodulator 41 and A/D converter 43. A preferred embodiment of the modem is disclosed in co-pending application Ser. No. 06/725,091. The modem operates to modulate a carrier signal with the image data and feed the signal through a telephone line interface circuit 44 for transmission to the telephone line.

The operation of the video phone is controlled by a microprocessor 56 which includes RAM and ROM. Microprocessor 56 is powered by a power supply 60 which is fed by the 115 volt AC line voltage.

A voltage reference and reset circuit 70 is used to provide analog power.

The protocol used by the video phone to initiate an interruption of audio transmission for the transmission of a video image asynchronously establishes a communication link in a short period of time. Due to the need for keeping interruptions of audio transmissions short, the long protocols used for TV or facsimile machines are not adequate for this purpose. As shown in FIG. 3, the protocol is initiated by a hardware preamble 72 which synchronizes a phase lock loop in the demodulator of the receiving video phone. This pattern is detected by the modem hardware in the receiver.

A preferred modulation scheme using two phases and eight amplitude levels is disclosed in co-pending patent application Ser. No. 06/745,091, filed June 14, 1985, which is hereby incorporated by reference. For this modulation scheme, the hardware preamble consists of a carrier burst at the maximum amplitude of the modulation levels at a first phase which is transmitted sixteen times. This is followed by a data clock sync pattern which is transmitted a total of twenty times. The data clock pattern consists of a symbol at maximum amplitude at the first phase followed by a symbol at maximum amplitude at a second phase. A second carrier burst at maximum amplitude in the first phase is then transmitted eight times. This is followed by a pattern transmitted four times which consists of a carrier burst at maximum amplitude in the first phase for four symbols followed by an eight symbol pattern of phase changes at maximum amplitude.

Upon recognition of the hardware preamble by the modem, microprocessor 56 directs telephone line interconnect circuit 44 to disconnect the telephone until the video image is received. Following the hardware preamble, which provides for the initial synchronization of the equipment, a software preamble 74 is sent and received and verified by the software in the receiver to indicate that a video frame is to follow. Following the software preamble, a pattern 76 is transmitted to provide for automatic gain control (AGC) adjustment. After the AGC pattern, a calibration line pattern 78 is transmitted, giving a pattern of symbols at each amplitude level to calibrate the receiver to the actual amplitude levels received.

Following the calibration pattern, an ID line 80 can be sent to indicate the configuration of the video phone sending the data and the type of video image being sent.

Following the protocol, the data representing the pixels of a video image are sent according to a modulation scheme which minimizes the effect of errors while maximizing transmission speed. Such a modulation scheme is shown in co-pending application Ser. No. 06/745,091.

FIG. 4 shows telephone line interface circuit 44 of FIG. 2 in more detail. A telephone 82 is coupled across nodes 84 and 86 of a bridge circuit. The bridge circuit has two additional nodes 88 and 90. The bridge has four legs, consisting of transmitting transformer 92, the telephone line 94, a resistor 96 and an RC circuit consisting of resistor 98 and capacitor 100. A receiver transformer 118 is coupled across nodes 88 and 90 through a capacitor 120.

A pair of switches 102 and 104 are provided. These switches are controlled by the microprocessor to configure phone detect circuit 44 in either the telephone mode or the modem picture mode. The switches are shown in the telephone usage mode with an RC circuit consisting of a resistor 106 and a capacitor 108 being coupled in parallel with transmitting transformer 92 by switch 102. Switch 104 couples a resistor 110 in parallel with resistor 96. These parallel combinations balance these two legs of the bridge during telephone usage.

The position of switches 102 and 104 shown in phantom couples a circuit in the picture mode. In this mode, a capacitor 112 is coupled across telephone 82 between nodes 84 and 86. This effectively shorts out the telephone during the picture mode. A resistor 114 is a low value resistor used as a fuse. In order to balance the bridge circuit, switch 104 switches resistor 110 in parallel with resistor 98 to lower the effective value of the resistance in that leg of the bridge.

A charging resistor 116 is coupled to capacitor 112 to insure that capacitor 112 will have a voltage imposed across it. Thus, when switch 102 switches to the picture mode and short circuits resistor 116, there is not a large voltage jump and a corresponding click which would be heard on the telephone.

The bridge circuit of FIG. 4 has two voltage divider legs, A and B. If circuit B is properly selected, there is cancellation of voice ECT from the phone into the receiver circuit through receiver transformer 118. This is a balanced duplexer that tends to keep telephone pickup from interfering with the protocol preamble. The resulting receiver gain is made low because network B is determined by network A. Receiver transformer 118 is a 10 kilohm to 10 kilohm transformer which sees a receiver circuit load of 10 kilohms. Transmitter transformer 92 is a 600 ohm to 600 ohm transformer with the transmitter having an impedance of 600 ohms. This is matched to the characteristic telephone line impedance of approximately 600 ohms.

In the picture mode (switch position in phantom) the receiver gain is much higher than in the case of telephone usage. Without the use of capacitor 112 to short out telephone 82, the circuit would be imbalanced and voice and noise pickup would tend to interfere with the picture transmission and reception.

The circuit of FIG. 4 is shown in more detail in FIG. 5. A transmitter circuit 122 is coupled to transmitting transformer 92 and receives signals from a microprocessor on an input line 124. A receiver circuit 126 is coupled to receiving transformer 118.

Switches 102 and 104 are activated by a relay 126 through a transistor 128 coupled to a control line 130. The control signal on control line 130 is provided by the microprocessor.

In addition to activating relay 126, the control signal serves to activate a transistor 132 which switches a resistor 134 to be in parallel with a resistor 136. Resistor 136 is a gain setting resistor for an operational amplifier 138 in receiver 126. By switching resistor 134 in parallel, the gain of operational amplifier 138 is lowered in the picture mode. This is because, in the picture mode, resistor 110 shunts resistor 98, thus lowering the attenuation produced by this resistor combination. The gain of operational amplifier 138 is accordingly lowered to compensate.

FIG. 6 shows clock generator circuit 50 in detail. A crystal oscillator 140 is coupled to an amplifier consisting of transistors 142 and 144. The output of the amplifier is coupled back to the crystal oscillator through a three stage RC network 146. The resistors and capacitors of RC circuit 146 are chosen to give 180° phase shift, which, in conjunction with the 180° phase shift through transistors 142 and 144 provides positive feedback in the series resonant mode of oscillator 140. The capacitors can have 10% tolerance since the circuit is insensitive to component values. The RC circuit attenuates the harmonics of the crystal, but gives a low pass filter at the oscillator series resonant frequency. The circuit thus prevents the overtone mode of the crystal oscillator from occurring in which it vibrates at a harmonic frequency.

FIG. 7 shows the voltage reference for the digital and analog power supplies in combination with a reset capability. A 5 volt digital voltage supply 148 is coupled to a resistor 150 and a diode 152. The analog 5 volt voltage supply is taken from the other end of the resistor and diode at a point 154. The analog and digital voltage supplies are isolated because the rapid movement of the digital signals produces noise which would otherwise impair the analog circuitry's operation. A capacitor 156 is applied to give a reset capability. When power is turned off, capacitor 156 discharges quickly. When power is reapplied, the analog voltage is delayed by the amount of time corresponding to the RC time constant of resistor 150 and capacitor 156.

FIG. 8 shows the analog circuit and modem 42 of FIG. 2 in more detail. Data from the microprocessor is provided on data lines D0–D7 to a transmitter latch 160 and a receiver latch 162. The data to be transmitted is provided from transmitter latch 160 to a digital-to-analog converter (DAC) 164. The analog output is provided through an amplifier 166 to a multiplexer 168. A control signal on a line 170 selects the transmit (TX) input of multiplexer 168 for a picture transmission. The signal is amplified again in an amplifier 172 and supplied to a filter 174. The signal is then provided through a delay equalizer 176 to a demultiplexer 178. The transmitted signal output (TX) is selected by a control line 180 and provided through a buffer 182 to phone detect circuit 44 of FIG. 2 for transmission on the telephone line.

Filter 174 and delay equalizer 176 anticipate some of the distortions to be suffered by the signal on the telephone line and partially compensate for these. The remaining amount of compensation is done by the receiving circuit which would be identical to FIG. 8. The receive signal is provided through a receiver input (RX) of multiplexer 168. This receive input is selected in the receive mode by a control signal on line 170. The receive signal is then passed through filter 174 and delay equalizer 176. The filter and delay equalizer on this end of the transmission complete the compensation for the group delay and other distortions on the telephone line. The receive signal is then passed through the demultiplexer 178 on the RX output under the control of a control signal on line 180.

Thus, by the use of multiplexer 168 and demultiplexer 178, the transmitted and received signals can share the same filter and delay equalizer, thus allowing the same amount of filtering and equalization to be done by one-half the circuitry since the transmitted signal is passed through the filter and equalizer twice, once on the transmission side and once on the receive side.

The received data is passed through a programmable gain control circuit 182, through a capacitor 184 to asynchronous demodulator 186. The signal then proceeds through a baseband filter 188, the output of which is provided to a clock recovery circuit 190 for recovery of the data clock. A sample and hold circuit 192 is also coupled to the output of baseband filter 188 to provide a digital output. The circuit is clocked by a signal at twice the carrier frequency on a control line 194.

The present invention also provides analog circuitry for performing modem functions during transmit and receive. This analog circuitry is accessed by the computer system by digital-to-analog converter 164 and analog-to-digital converter 192. System performance is directly proportional to the DC stability of the analog circuitry. Since the analog (modem) circuitry is a sample data system (switched capacitor) it is not immune to DC offset voltages, due to charge injection from the switched capacitor filter sections. A clever way to minimize DC offset, resulting in a system performance gain of up to 8 dB is an analog level shift. The system's A/D converter 192 is adjusted to receive a 2 Vp-p wave centered on 2 VDC. The modem analog circuitry is centered at 5 VDC with the capacity of a 10 Vp-p wave. The modulated data, after passing through Tx-Rx filter 174 and programmable gain control (PGC) 182 is AC coupled (through capacitor 184) to demodulator 186 to establish a DC reference. After demodulation, the signal is passed into baseband filter 188 (where it will parasitically pick up the DC offset).

After baseband filter 188, the signal is converted to digital form with sample and hold circuit 192 and then passed through a 2:5 resist divider (resistors 200, 202) to ground, which reduces the DC level from 5 VDC to 2 VDC, consequently reducing the signal from 5 Vpp to 1 Vpp. The output is provided on a line 204. It is also evident that any DC offset picked up in baseband filter 188, say 50 mV, is divided by 2:5 and thereby reduced to 20 mV. This is an 8 dB improvement over taking the signal out of the baseband undivided and passing it into an A/D converter referenced at 5 VDC.

In order to be able to handle the higher voltage analog signals, the digital input data signals D0–D7, and the control signals, are level shifted from 5 volts to 10 volts via a circuit such as that shown in FIG. 8A. FIG. 8A shows a current mirror with an input on a line 196 which is referenced to 5 volts and an output on the line 198 which is referenced to 10 volts.

Returning to FIG. 8, a voltage divider composed of resistors 200 and 202 provides an output signal on a line 204 which is divided down to be referenced to 5 volts. Any DC offset picked up will also be divided in half, thus reducing its impact on the data signal.

The circuit of FIG. 8 also allows a diagnostic feedback mode. By appropriate control signals, a control signal can be provided through a loop back AND gate 204 to select the transmit input for multiplexer 168 while the receive output of demultiplexer 178 is selected. The video unit circuitry can thus transmit to itself for diagnostic checkout of the various circuit elements.

As will be understood by those familiar with the art, the present invention may be embodied in other specific forms without departing from the spirit or essential characteristics thereof. For example, other configurations of impedances could be used to balance the various legs of the bridge of FIG. 4 and FIG. 5. Accordingly, the disclosure of the preferred embodiment of the present invention is intended to be illustrative, but not limiting, of the scope of the invention which is set forth in the following claims.

What is claimed is:

1. A method for transmitting a single frame of a video image and audio signals over an ordinary telephone line comprising the steps of:
   asynchronously transmitting protocol data, said protocol data including
   hardware preamble data for use by a remote video phone to synchronize a clock at said remote video phone with said protocol data,
   software preamble data for identifying the following data as representing a video image,
   automatic gain control adjustment data, and
   amplitude calibration data for correlating each received amplitude modulation level to a corresponding assigned amplitude modulation level; and
   asynchronously transmitting over said telephone line a modulated signal representing said video image in a burst.

2. The method of claim 1 further comprising the step of disabling an audio transmitting and receiving means at said remote video phone in response to reception of said hardware preamble data.

3. The method of claim 1 wherein said modulated signal comprises a plurality of phases and amplitude levels and wherein said amplitude calibration data comprises each of said amplitude levels at a first phase and at least one of said amplitude levels of each of said plurality of phases.

4. In a conversational freeze-frame video phone for transmitting a single frame of a video image over an ordinary telephone line, the improvement comprising:
   means for transmitting and receiving an audio signal; and
   means, coupled to said telephone line, for asynchronously transmitting a modulated signal representing said video image in a burst, said transmitting means being operative to transmit protocol data prior to transmission of said burst, said protocol data including
   hardware preamble data for use by a remote video phone to synchronize a clock at said remote video phone with said protocol data,
   software preamble data for identifying the following data as representing a video image, automatic gain control adjustment data, and
   amplitude calibration data for correlating each received amplitude modulation level to a corresponding assigned amplitude modulation level.

5. The apparatus of claim 4 further comprising means for disabling said audio transmitting and receiving means.

6. The apparatus of claim 4 wherein said modulated signal comprises a plurality of phases and amplitude levels and wherein said amplitude calibration data comprises each of said amplitude levels at a first phase and at least one of said amplitude levels of each of said plurality of phases.

* * * * *